Aug. 6, 1940.   E. W. STEVENS ET AL   2,210,154
RECORDING AND INDICATING APPARATUS FOR LOCOMOTIVES AND THE LIKE
Filed Feb. 23, 1938   9 Sheets-Sheet 1

Fig.1.

INVENTORS
Edward W. Stevens
BY James A. Roberts
Watson, Bristol, Johnson & Leavenworth
ATTORNEYS

Aug. 6, 1940.  E. W. STEVENS ET AL  2,210,154
RECORDING AND INDICATING APPARATUS FOR LOCOMOTIVES AND THE LIKE
Filed Feb. 23, 1938  9 Sheets-Sheet 4

INVENTORS
Edward W. Stevens
BY James A. Roberts
Watson, Bristol, Johnson & Leavenworth
ATTORNEYS Aug. 6, 1940.   E. W. STEVENS ET AL   2,210,154
RECORDING AND INDICATING APPARATUS FOR LOCOMOTIVES AND THE LIKE
Filed Feb. 23, 1939   9 Sheets-Sheet 6

INVENTORS
Edward W. Stevens
BY James A. Roberts
Watson, Bristol, Johnson & Leavenworth
ATTORNEYS Aug. 6, 1940.  E. W. STEVENS ET AL  2,210,154
RECORDING AND INDICATING APPARATUS FOR LOCOMOTIVES AND THE LIKE
Filed Feb. 23, 1938   9 Sheets-Sheet 8

Fig.15.

INVENTORS
Edward W. Stevens
BY James A. Roberts
Watson, Bristol, Johnson & Leavenworth
ATTORNEYS Aug. 6, 1940.  E. W. STEVENS ET AL  2,210,154
RECORDING AND INDICATING APPARATUS FOR LOCOMOTIVES AND THE LIKE
Filed Feb. 23, 1938  9 Sheets-Sheet 9

INVENTORS
Edward W. Stevens
BY James A. Roberts
Watson, Bristol, Johnson & Leavenworth
ATTORNEYS Patented Aug. 6, 1940

2,210,154

UNITED STATES PATENT OFFICE 2,210,154

RECORDING AND INDICATING APPARATUS FOR LOCOMOTIVES AND THE LIKE

Edward W. Stevens and James A. Roberts, Detroit, Mich., assignors to Chicago Pneumatic Tool Company, New York, N. Y., a corporation of New Jersey Application February 23, 1938, Serial No. 191,990

6 Claims. (Cl. 264—14)

This invention relates to apparatus adapted to be installed on locomotives and similar vehicles for indicating and recording speed and distance traveled.

The invention has for its object, generally, the provision of an improved apparatus of the character indicated which is readily installed and calibrated so as to give accurate indications and is relatively free, when operating, from the effects of vibration and other disturbances arising in service from the locomotive or vehicle on which it is installed.

Another object is to provide a recording apparatus or instrument of the character indicated which avoids the use of centrifugal force as the actuating agent together with the attendant use of delicate parts that may become worn and require frequent renewals and difficult calibrations, and substitute instead a speed responsive hydraulically actuated device which may be made accurate and rugged and requires relatively little attention, and when once calibrated retains its adjustment for relatively long periods.

Another object is to provide an arrangement of responsive and actuating elements in apparatus of the character indicated which is compact and may be incorporated in a single casing together with the distance and speed recording mechanism in order to provide a responsive instrument or unit that has all the operating parts protected from substantially all of the hazards of road service when installed on locomotives and similar vehicles.

Another object is to provide improved tension and feeding mechanism for moving the chart in the responsive instrument or unit of apparatus of the character indicated whereby the liability of the introduction of transient errors in the record made while in service is substantially eliminated.

Another object is to provide an improved metering unit which is adapted to be in association with a wheel of the locomotive or other vehicle that is in contact with a rail or element of the distance traversed, and which may be readily positioned and adjusted to give continuous and accurate movement for actuating the responsive unit.

Another object is to provide an improved mounting for the metering wheel of a metering unit of the character indicated whereby long life, little wear and a high degree of accuracy in the actuating movement transmitted is at all times insured.

Another object is to provide an improved connecting unit for apparatus of the character described whereby the independence of the responsive unit and of the metering unit is preserved while insuring cooperative association and at the same time providing for accuracy in the transmission of actuating movement to the responsive unit.

Still another object is to provide an improved method of calibrating the hydraulically actuated device of a responsive unit in apparatus of the character indicated which method is simple and comprises steps that may be practiced while the unit is in service and results in a relatively high degree of precision where carried out by ordinary service attendants.

Other objects of the invention will in part be obvious and will in part appear hereinafter.

The invention accordingly comprises the features of construction, combination of elements and arrangement of parts, which will be exemplified in the construction hereinafter set forth and the scope of the invention will be indicated in the claims.

For a fuller understanding of the nature and objects of the invention, reference should be had to the following detailed description taken in connection with the accompanying drawings, in which.

Figure 1:
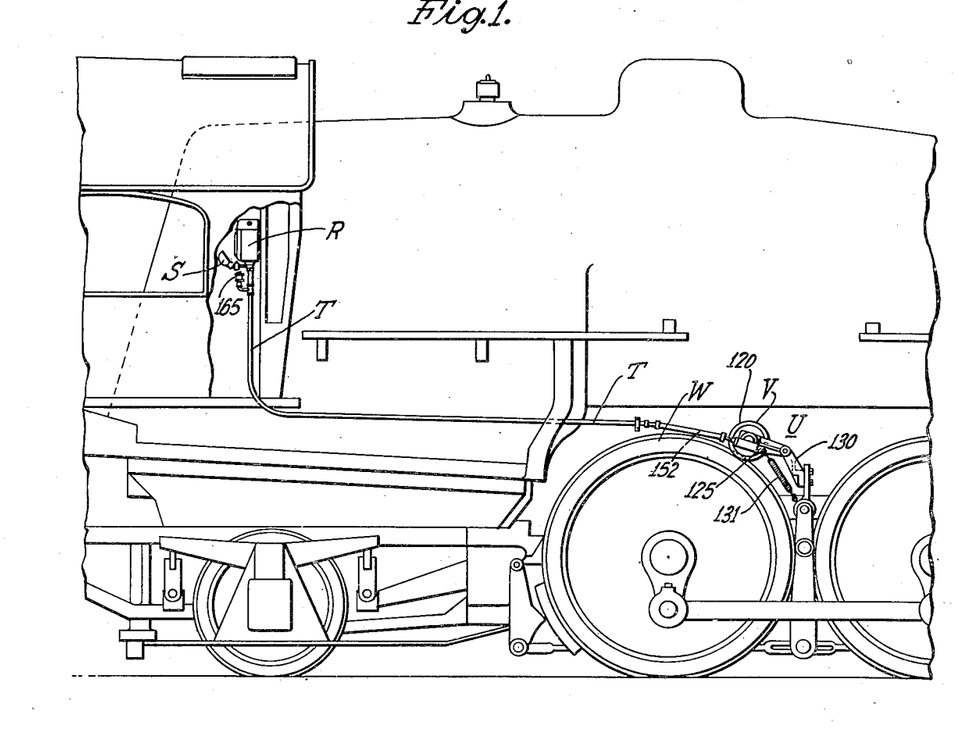
Fig. 1 is a fragmentary view mainly in elevation, parts being broken away, showing an application of the invention to a conventional locomotive.

Referring now to the drawings, and particularly Fig. 1, an exemplary illustration of the application of the invention to a steam locomotive is shown. In this illustration, a speed responsive device is shown assembled as a unit R and disposed in the cab on the right hand side of the locomotive with its indicating or dial side outwards so that it may be inspected by the engineman at all times. A lamp S is also shown associated with the unit R and arranged in a position such as to illuminate the dial and front of the casing. Cooperatively associated at the bottom of the unit R is a suitable motion transmitting and connecting unit T. While the motion transmitting and connecting unit may have any suitable form, a rotatable flexible cable is advantageous and is shown by way of example as extending out of the cab and connected with a metering unit U. This latter may also have any suitable form, but is here shown as comprising a metering wheel V that is in frictional engagement with the tire of a rail contacting wheel W of the locomotive. Any rail contacting wheel may, of course, be selected. Such wheel, however, is advantageously the rear right driver, as shown.

The responsive unit

Figure 2:
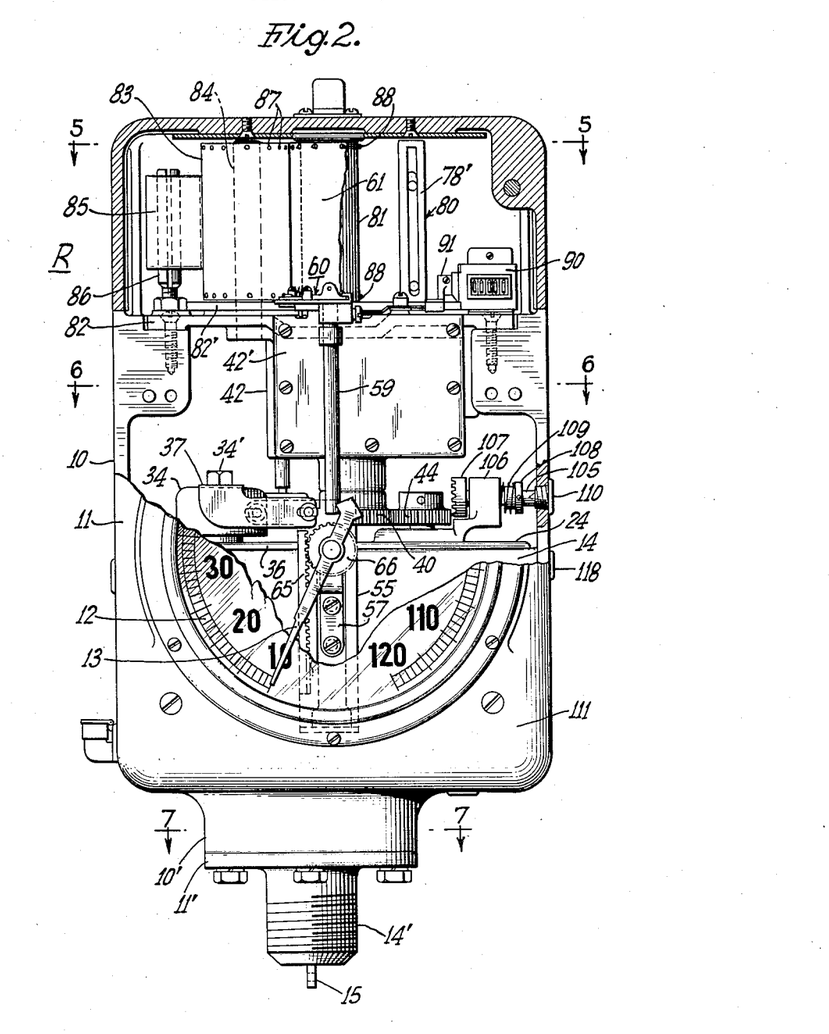
Fig. 2 is a view, mainly in front elevation, parts being broken away, showing the responsive unit, illustrated in Fig. 1, on an enlarged scale.

The responsive unit R is an instrument having speed responsive means and mechanism actuated thereby for indicating the speed at which the locomotive or other vehicle on which it is installed moves. This mechanism preferably includes mechanism for recording the speed and distance traveled. Fig. 2 shows this instrument in front elevation while sections giving details are shown in Figs. 3 to 9. The instrument proper is housed in a casing 10 which is preferably constructed to be dust-proof and has a removable front cover 11 provided with a dial 12 having a scale showing speed, over which an indicating hand 13 is arranged to move. The casing 10 is preferably a metal casting having an integral block 14 occupying substantially the whole of the lower portion of the interior of the casing. The block 14 advantageously has the back and sides of the casing integrally attached and extending upwardly therefrom, there being suitable securing devices r (see Figs. 3 and 4) at the back of the casing for mounting the same securely on the wall of the cab or other place where the instrument is to be installed. The space above the block 14 in the casing is adapted to house the moving parts of the indicating and responsive mechanism and the connections which move the hand 13. The cover 11 is advantageously constructed to include the top-wall of the casing, as hereinafter described. At the bottom of casing 10 the walls are extended downwardly and constricted as shown at 10' and have a removable cover plate 11' that is secured to the constricted walls and encloses a shallow chamber a. This plate has a bearing block 14' depending therefrom in which is journaled a terminal shaft 15 which is adapted to be coupled to the upper end of the connecting unit T for receiving actuating motion when the locomotive moves. Shaft 15 has a gear 16 secured at its upper end which is arranged to work in the chamber a and actuate a reversing and transmitting gear train therein.

Figure 7:
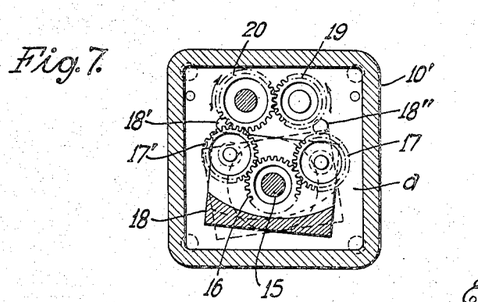
Fig. 7 is another horizontal sectional view of the responsive unit taken on the line 7—7 of Fig. 2.
Figure 8:
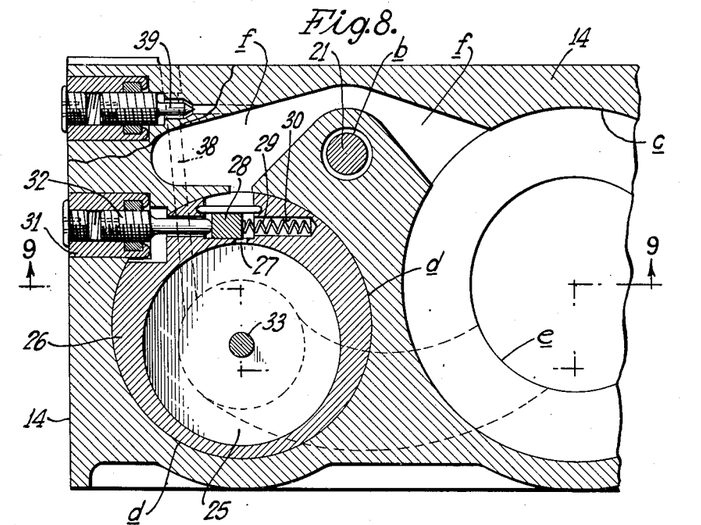
Fig. 8 is an enlarged fragmentary horizontal sectional view of the responsive unit including the responsive element, the section being taken on the line 8—8 of Fig. 3.

The reversing and transmitting gear train is shown in Fig. 7 and consists of a pair of gears 17 and 17' rotatively mounted on opposite sides of a bracket 18 that is adapted to swing alternately into one or another of two positions through a small arc about the axis of shaft 15 as a pivot. Gears 17 and 17' are so mounted in the bracket 18 that each is permanently in mesh with the gear 16. Plate 11' has stops 18' and 18'' for limiting the swing of the bracket 18 to the two positions (one of which is shown in full lines, the other in broken lines), these stops operating respectively when the bracket is turned either clockwise or counterclockwise. Plate 11' also supports a stud on which an idler 19 turns. This idler is so positioned on plate 11' as to be in mesh with an intermediate gear 20 secured at the lower end of a shaft 21 that is journaled in casing 10. The idler 19 is also so positioned that it is engaged by gear 17 when bracket 18 is swung counterclockwise (looking down on the drawing), this engagement being caused by the counterclockwise rotation of gear 16, a portion of its motion being transmitted frictionally to the bracket 18. In such position gear 20 is the fourth in the train and is rotated clockwise. Should the direction of travel of the locomotive be reversed and gear 16 rotate clockwise, then bracket 18 also swings clockwise through its limited arc so as to disengage gears 17 and 19 and bring about engagement of gear 17' with gear 20. Gear 20 is now the third gear in the train and is again rotated clockwise.

The shaft 21 that is rotated by gear 20 thus has a constant direction of rotation irrespective of the direction in which the locomotive moves. To transmit this rotation to a convenient point in casing 10, shaft 21 is disposed to pass through a vertical bore b in block 14 and mounted so as to turn therein with relatively little friction and has a pinion 22 at its upper end in the free space in casing 10. From pinion 22, motion is taken off by suitable trains for operating the speed responsive means together with the actuated mechanism associated therewith in the casing 10.

The speed responsive means of the present invention includes a hydraulic system having a responsive element connected to move the actuated mechanism; the responsive element being operated by a suitable fluid set in motion by a positive displacement pump driven by pinion 22. By such means the flow of fluid may be made accurately to have a velocity that is a linear function of the speed of the locomotive and the motion transmitted by the connecting unit T to shafts 15 and 21. The pinion 22 is coupled to drive the pump, shown generally at 23, by means of a gear train disposed in casing 10 above block 14, as hereinafter described. This pump is preferably constructed as a unit and is disposed in a cylindrical chamber c that is formed in block 14 and closed at the top by a plate 24. (See Fig. 4.)

The responsive element of the hydraulic system here provided is a flow operated piston 25 (see Figs. 3 and 9) that works in the bore of a liner 26 pressed or keyed in another cylindrical chamber d of the block 14. The cylindrical chambers c and d preferably have their axes vertical and parallel to that of the bore b and are advantageously disposed in the front part of block 14 above the wall that separates the chambers c and d from the chamber a and have their bottoms connected in communication by means of a passage e formed in block 14. The chambers c and d have a second connecting passage f, preferably disposed in the wall of block 14 at the rear and proportioned to have a relatively large cross-sectional area. The chambers c and d together with passages e and f are seen thus to provide a circuit for the hydraulic system through which fluid may be circulated by the pump 23. The chambers c and d also preferably have a communicating passage g at their upper ends (see Fig. 9) for equalizing purposes.

The direction of fluid circulation produced in this system by pump 23 is such as to impact the piston 25 at the bottom. The fluid pumped hence enters liner 26 through a bottom opening in register with passage e. The piston 25, when impacted by fluid, rises in the liner 26 uncovering a portion of a metering orifice or slot 27 which provides an exit for the fluid. This slot is cut in the wall of the liner 26 parallel to the direction of piston movement, and is positioned to be in register with passage f. Slot 27 is relatively narrow and is so proportioned that its active length varies with the amount of fluid circulated at any instant in response to the various speeds to be indicated. The width and length of slot 27 are thus factors requiring precision, since fluid must be passed at a certain rate in response to a given speed.

To obtain a precise width desired, the slot 27 is made adjustable and provided with a movable bar or valve element 28 that is disposed parallel to the slot in a recess formed in the wall of liner 26 at the rear of the slot 27. To accommodate such recess in the wall of the liner, the bore thereof in which the piston 25 works may be eccentrically disposed in the liner, and the recess cut as a relatively wide slot from the outside in the thick portion, as shown. The bar 28 is normally held in this recess in a position entirely clearing the opening of slot 27 by the pressure of two or more springs 29 that are interposed between the bar and the ends of sockets 30 that communicate with the recess and extend transversely in the wall of the liner. This recess may be also formed open at the top and has the sockets 30 extended to the outside by continuing them through the wall of the liner in the direction in which the springs 29 urge bar 28. When the liner is in place, such extensions are arranged to be in register with the openings in small threaded sleeves 31, pressed into the block 14, from the outside of the casing 10 on the piston side. Engaging with each sleeve 31 is an adjusting screw 32 whose inner end bears against the bar 28 to urge it against the pressure of springs 29. The screws 32 may hence be turned for adjustment purposes from the outside of casing 10 by means of a suitable wrench. By turning both of the screws 32 it is seen that bar 28 is caused to move with parallel motion to widen or narrow the effective width of the slot 27, as the case may be.

The piston 25, when in its lowermost position preferably does not rest on the bottom of liner 26 which would close entirely the slot 27 but is positioned to uncover a small portion, marked $x$ in Fig. 3, which permits the free passage of a minimum amount of fluid representing a speed below which the responsive unit R does not work. The initial setting of this uncovered portion of the length of slot 27 is determined by the length of piston rod 33 that depends from a weight 34 which is adjustably mounted thereon at the upper end by suitable means, such as a screw thread. The rod 33 has the piston 25 made fast on its lower end and passes through and works in a gland 35 on a cover plate 36 that closes the upper end of the piston cylinder. The weight 34 thus supports the weight of the piston 25 but is removable therefrom, should a change in the weight system at any time be desired. The weight system thus provided is seen to provide a force resisting the rise of the piston 25 when impacted by fluid. Such force being due to gravity, it is seen that it gives a constant resistance against which the piston works that does not vary with age or wear. In order that the weight 34 may remain fixed in a position to which it has been adjusted, a locknut 34' is slipped over the upper end of rod 33 into engagement therewith. For transmitting the motion of the piston 25 to the indicating mechanism, a connecting bracket, shown at 37, is also attached to the protruding end of rod 33 and is advantageously interposed between weight 34 and the locknut 34'.

An additional means for regulating the passage of fluid through the metering slot 27 and hence regulating the movement of the piston 25 may be incorporated in the casing 10, at the option of the designer, and advantageously has the form of an adjustable by-pass about the slot 27. Such by-pass is here shown in Fig. 8 and comprises a passage 38, consisting of two communicating small bores formed in the block 14, one of which leads from passage e, the other from passage f, and has a suitable throttle valve, such as needle valve 39, disposed at the juncture of the bores for controlling the amount of fluid passed. This control valve, like screws 32, is advantageously so placed in the casing that it is accessible from the outside at a point adjacent the screws 32 whereby a serviceman, who is calibrating the instrument can adjust without changing his position, either a screw 32 or the valve 39, at will.

Figure 4:
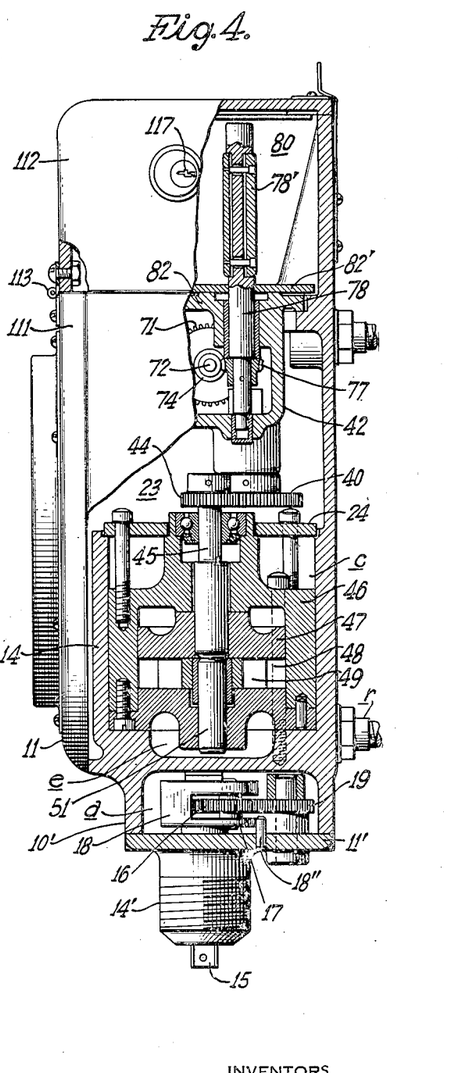
Fig. 4 is a similar vertical sectional view of the responsive unit, shown in Fig. 2, as seen from the right hand side.
Figure 12:
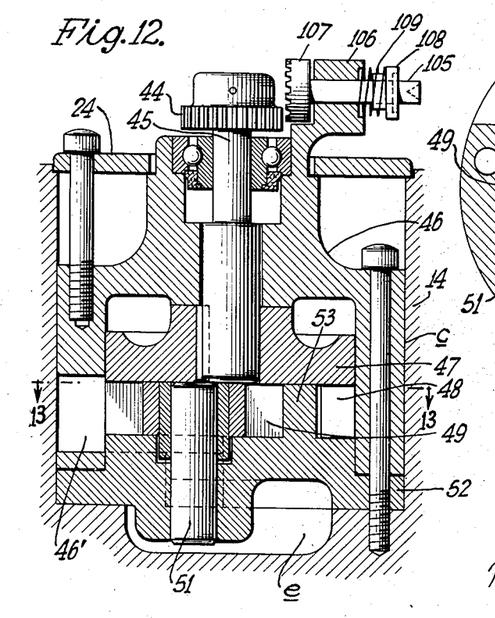
Fig. 12 is a fragmentary sectional view showing further details of the pump unit that is shown in Figs. 4 and 8.
Figure 13:
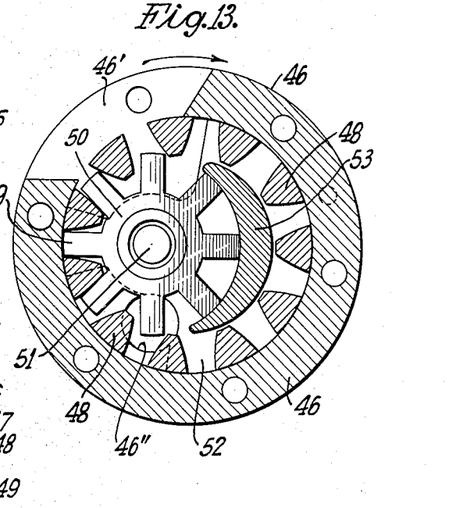
Fig. 13 is a horizontal sectional view of the pump unit shown in Fig. 12, taken on the line 13—13 therein.

The pump unit, shown at 23 in Fig. 4, is shown more fully in detail in Figs. 12 and 13 and has driving motion transmitted to it from pinion 22. This transmission is accomplished by means of a gear train consisting of an intermediate gear 40, secured on the lower outside end of a shaft 41 that is journaled in the bottom wall of a housing 42, and a gear 44. Housing 42 is positioned to hold gear 40 so as to be permanently in mesh with pinion 22 and the pump driving gear 44. Gear 44 is on the upper end of a shaft 45 that is journaled in a cage 46 which houses the working elements of the pump. This cage has a working fit in the chamber c and is positioned so as to have its openings 46′ and 46″, corresponding to pump inlet and exit, in register respectively with passages f and e. The pump in order to have positive displacement is advantageously constructed with rotary gears, since the rotary driving motion transmitted may thereby be utilized directly to produce pumping action without first converting it in whole or in part into reciprocating motion. The shaft 45 is provided at its end within cage 46 with a pump-rotor or gear 47. This latter is made in the form of disc of diameter substantially that of the space within the cage and provided with depending teeth 48 that mesh with teeth 49 of a hypocyclic gear 50 journaled on a stud 51 in a removable plate 52 that closes the bottom of cage 46. The gear 50 thus works within the space enclosed by the teeth 48 of the pump-rotor. A partition 53 formed on plate 52 is arranged to project into the space enclosed by teeth 48 that is not occupied by gear 50 and cooperates with the teeth of the latter in preventing leakage of fluid from the outlet back to the inlet of the pump. The inlet 46′ is in the side of the cage 46 adjacent the point where teeth 48 and 49 engage, this opening extending substantially from the point where such teeth have maximum engagement to a point some distance circumferentially further around the side in the direction in which the pump-rotor turns. Fluid entering from the passage f passes on through inlet 46′ and is caught in the space between the teeth 48 and 49 and is then carried past the partition 53 to be released in the space over exit opening 46″ in the plate 52. The working fluid thus pumped passes on into passage e. Some pressure is, of course, built up as the fluid is pumped and provides the head which insures the flow of the fluid through the circuit comprising the chambered spaces e, d, f and c.

Figure 10:
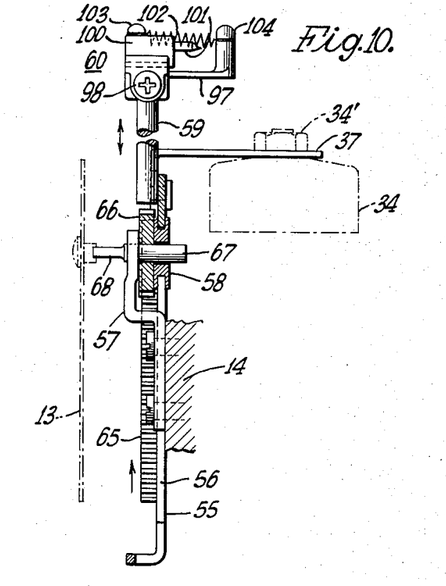
Fig. 10 is a fragmentary view, in side elevation, showing details of the mechanism that actuates the indicator of the responsive unit.
Figure 20:
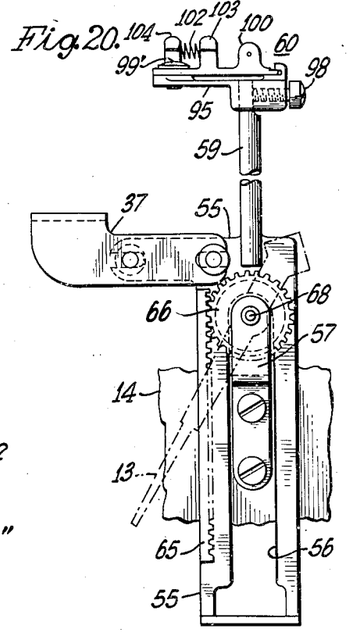
Fig. 20 is a front elevational view, showing further details of the mechanism shown in Fig. 10.

To indicate a speed corresponding to a given rate of fluid flow produced by pump 23, the piston 25 is mechanically connected through the bracket 37 to transmit its movement, which results when it is impacted by the fluid circulated, to suitable indicator actuating means. Such means here comprises an actuating bar 55 that is disposed to slide vertically in the casing 10, in the space that is between block 14 and cover 11. This bar, shown in detail in Figs. 10 and 20, is connected to the bracket 37 at its upper end and is formed with a slotted lower portion 56 that works over a member 57 secured to block 14. This slot carries a sheave 58 that is arranged to slide therein in the space over member 57. Projecting upwardly from the bar 55 is a rod 59 that carries a record making device 60. This device is adapted to be moved transversely across a chart 61 that is mounted for longitudinal movement in the upper part of the casing 10, as hereinafter described. This longitudinal movement of the chart 61 is produced, as will be seen, by the gearing in housing 42 and is hence proportional to the distance traveled by the locomotive.

To move the hand 13 by means of actuating bar 55, the latter is provided with a rack 65 on one side of the lower portion, which rack is adapted to engage with a small pinion 66 that has a shaft 67 mounted in bearings respectively in member 57 and sheave 58. Shaft 67 has an arbor 68 that extends through an opening in cover 11 a sufficient distance to have hand 13 mounted thereon for travel around the dial 12 in response to movements of bar 55 and the connected piston 25. The travel of hand 13 and the distance traversed by the device 60 across chart 61 are thus results of the rate at which fluid is being circulated by pump 23 and hence representative of the speed of the locomotive.

Figure 6:
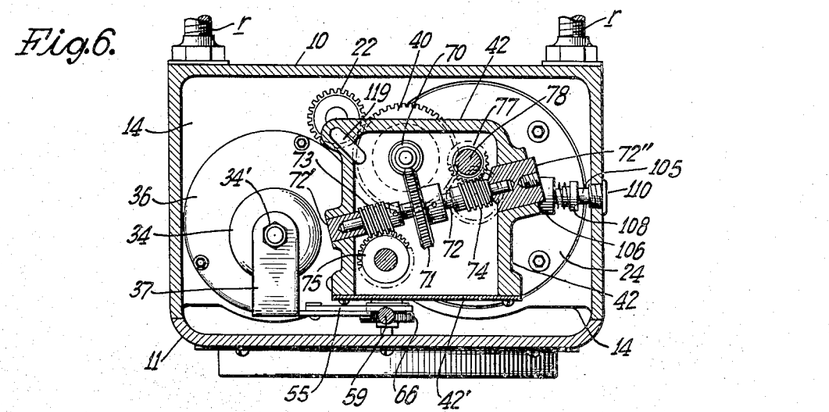
Fig. 6 is a similar horizontal sectional view of the responsive unit taken on the line 6—6 of Fig. 2.
Figure 19:
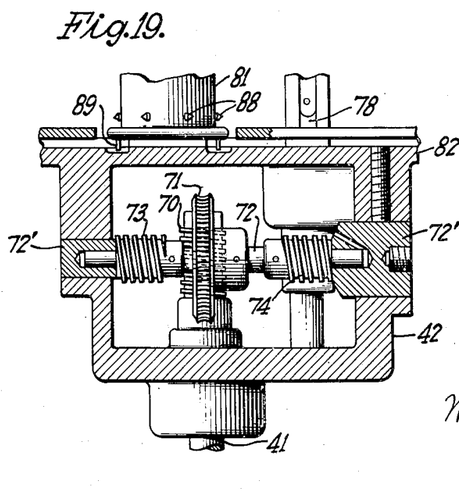
Fig. 19 is an enlarged front elevation of the housing for certain transmission gearing in the responsive unit, the housing being shown with front cover removed.

The transmission gearing in housing 42 is shown in detail in Figs. 6 and 19 and comprises a worm 70 on the inner end of the driving shaft 41 which meshes with a worm gear 71 on a horizontal shaft 72 that is rotatively disposed in housing 42, by means of bearings 72′ and 72″; a somewhat diagonal disposition being preferred in order to get a greater spacing of the points at which motion is taken off from the shaft. To this end shaft 72 has two worms, denoted 73 and 74, near its respective ends in the housing. In mesh with worm 73 is a worm gear 75 that drives a shaft 76 journaled in the top-wall of housing 42 for actuating a feeding drum 81 for the chart 61. In mesh with the worm 74 is a worm gear 77 on a shaft 78 that is similarly journaled in the top-wall of housing 42. Shaft 78 is slotted at its upper end and contains an element 78′ that engages frictionally with a bobbin 79 that is disposed thereon and turns to provide a receiving roll 80 for the chart 61. The housing 42 has a removable front cover plate 42′ and has a top-wall 82 that is extended laterally to provide a main plate for engaging with brackets that support the housing 42 in place in the casing 10. When the housing is in position, it provides means for holding gear 40 in proper relation to both pinion 22 and gear 44 and on its upper side provides the simultaneously driven shafts 76 and 78 for actuating the chart feeding mechanism.

Figure 5:
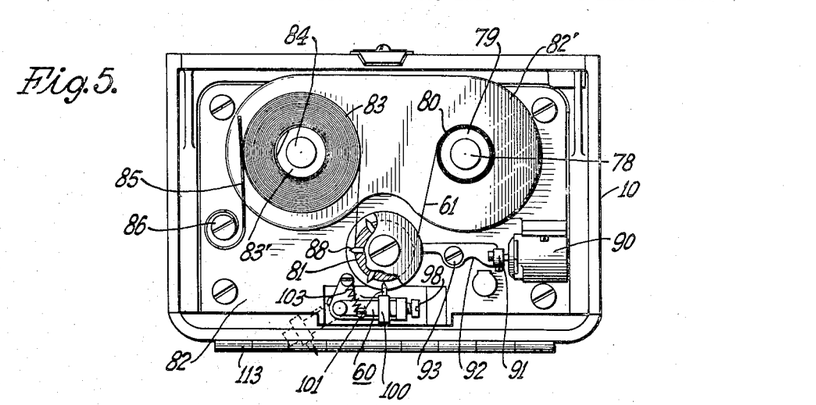
Fig. 5 is a horizontal sectional view of the responsive unit, taken on the line 5—5 of Fig. 2.

The chart feeding mechanism is here mounted on the upper side of the main plate 82, as shown in plan in Fig. 5, an auxiliary plate 82′ being preferably disposed on plate 82 to support the chart rolls. This feeding mechanism comprises a supply roll 83 on a bobbin 83′ that supplies a continuous web of chart. Bobbin 83′ is mounted to turn freely on a post 84 that is fixed in the main plate 82, but passes up through plate 82′, as also does shaft 78. The chart-web is fed from roll 83 and passed therefrom over feeding drum 81 to the receiving roll 80. To put a desired tension on the chart-web thus fed, a leaf spring 85, which preferably has one or more coils about an anchoring post 86 that is secured on plate 82, is made to bear at its free end against the outer surface of the supply roll 83. By this arrangement the pressure of springs 85 is greatest when the roll 83 has its greatest diameter. As the chart-web is fed away the diameter of this roll is reduced with a consequent reduction of pressure from the spring 85. Thus it is seen that the pressure of spring 85 on the roll 83 is approximately in direct proportion to the diameter of the roll. Hence there is practically an even tension on the chart-web fed from the roll 83 from the time it is initially disposed on post 84 until it is substantially all fed away to the receiving roll 80.

The chart-web has perforations 87, preferably disposed along both its top and bottom edges, which are made to engage with sprocket teeth 88 formed on drum 81 whereby the web is positively fed to the receiving roll 80. The surface of drum 81 is such as to provide a suitable backing for that part of the chart-web over which the device 60 moves when making a mark. The chart-web is also positively drawn from drum 81 and wrapped onto the receiving roll 80 by means of the frictional drive of bobbin 79 had from shaft 78 which rotates simultaneously with shaft 76 at a rate slightly greater than shaft 76 whereby the roll 80 is permitted to slip and hence avoids tearing the chart-web. The total number of revolutions made by the drum 81 is, of course, proportional to the distance traveled by the locomotive. The chart-web whose longitudinal movement is positively effected by this mechanism may in consequence be marked, if desired, to show distance by suitable indicating marks; for example, by indicia spaced along a margin of the web to show miles.

An integrating device for recording and showing the total mileage traversed by the locomotive, or other vehicle equipped with the instrument, may also be provided in the casing 10; such device being advantageously arranged to be actuated by the gear train of housing 42. A suitable device of this character is a mechanical counter of the so-called "cyclometer" type. A counter 90 for this purpose is shown operatively mounted on plate 82 (see Figs. 2 and 5), and provided with an actuating lever 91 depending at one end. Lever 91 is arranged to be engaged by one end of a spring biased lever 92, that is pivotally mounted at 93 on plate 82 and has its other end arranged to be engaged periodically by one of a plurality of pins 89 (see Fig. 19) that are on drum 81. The spacing of these pins about drum 81 is preferably made to correspond with the length moved by the chart when the locomotive has moved a specific distance; for example, the length moved by the chart when the locomotive has gone one mile. The counter would in consequence show the total mileage traveled by the locomotive.

Figure 11:
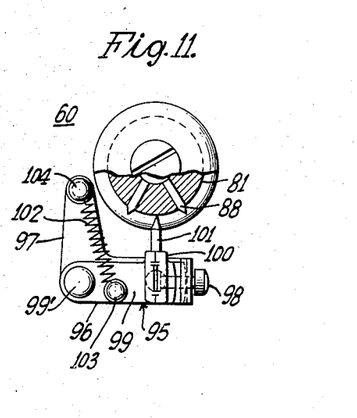
Fig. 11 is an enlarged horizontal plan view of the record making device that is shown in the upper portion of Fig. 10.

The construction of the record making device 60 here employed is shown in detail in Fig. 11. Such device comprises a supporting bracket 95 which is preferably L-shaped and consists of arms 96 and 97, the arm 96 being disposed across the front of drum 81 and provided with a screw 98 at its free end for securing the same to the upper end of rod 59. A lever 99 is pivotally mounted on arm 96 at 99' and is provided with a gripping barrel 100, in which is disposed a stylus or pencil 101, the point of which is made to bear with proper pressure on the chart 61. This is achieved by providing a tensioning element in the form of a spring 102 attached at 103 to the lever 99 and at 104 to a portion of arm 97; the latter arm extending inwardly at the side of the drum 81. Vertical movement of rod 59 is hence seen to cause stylus 101 to mark a line on the surface of drum 81, or on any intervening portion of chart 61.

In order to assist in calibrating the responsive unit here provided and/or to check whether or not a proper metering unit has been attached, it is desirable to count the number of revolutions transmitted to the instrument when the locomotive is run a measured distance. As the calibrations are made on the instrument, it is advantageous to count the revolutions made by some one of the gear trains in casing 10 which is driven by motion from the unit U. To this end, a suitable revolution counting or timing shaft, accessible from without the casing 10, is provided. An exemplary shaft of this character is shown at 105 journaled in a bracket 106 that is formed on and projects upwardly from the cage 46. Shaft 105 has a crown gear 107 at one end adapted to mesh with the pump driving gear 44. The other end of shaft 105 has a collar 108 pinned thereto and a spring 109 interposed between it and bracket 106 to keep gear 107 out of engagement with gear 44 except when a count of the revolutions is to be made. To do this, the casing 10 is provided with an opening normally closed by a screw plug 110; the opening being positioned adjacent the free end of shaft 105 so as to admit the shaft of a revolution counting instrument or tachometer for engagement with the end of shaft 105. To facilitate this engagement, the free end of shaft 105 is preferably countersunk, as shown. When the screw plug is removed and such a tachometer inserted for calibration purposes by a service attendant, it is seen that this causes the shaft 105 to be moved and the spring 109 to be compressed and the gear 107 to become engaged with gear 44 whereby revolutions are shown on the tachometer which are proportional to those of the terminal shaft 15.

The removable cover 11 for the casing 10 is preferably made in sections, for example, lower and upper sections denoted 111 and 112, respectively. The line dividing the cover into these sections is preferably so located that the division is substantially at the level of plate 82 in the casing. These sections are advantageously articulated by hinges, as shown at 113. The upper section 112 which, as already indicated, preferably includes the top-wall of casing 10 may also include a portion of the side walls. In such form it provides a hinged housing for the upper space containing chart 61, which may be swung back at will without disturbing the lower portion 111 that carries the dial 12 and is hence more permanently secured to the casing 10. When section 112 is swung back, it is seen to afford access to the mechanism in casing 10 so that chart 61 and the counter 90 may be inspected and records taken therefrom. Since unauthorized access is undesirable, a locking device 115 is preferably provided, which may be of any suitable type, for example, that commonly referred to as a "Yale lock." A tumbler barrel of this character is shown at 116 in Fig. 3; a key opening 117 by which the same may be actuated being shown in Fig. 4. The casing also has one or more sealed openings leading to the circulating system, as shown at 118 in Fig. 2, through which lubricant and/or working fluid may be introduced or withdrawn at will.

The working fluid may be substantially any relatively incompressible liquid that does not react with the materials of the system and has a relatively low viscosity; for example, a liquid hydrocarbon of high boiling point and viscosity not in excess of 10 absolute units. When a liquid hydrocarbon is used, since it has lubricating properties, it may also be used as the lubricant to be employed in housing 42. Housing 42 for this purpose is also provided with suitable liquid filling and withdrawal connections; a withdrawal channel being shown by way of example at 119 in Fig. 6.

*The metering unit*

Figure 14:
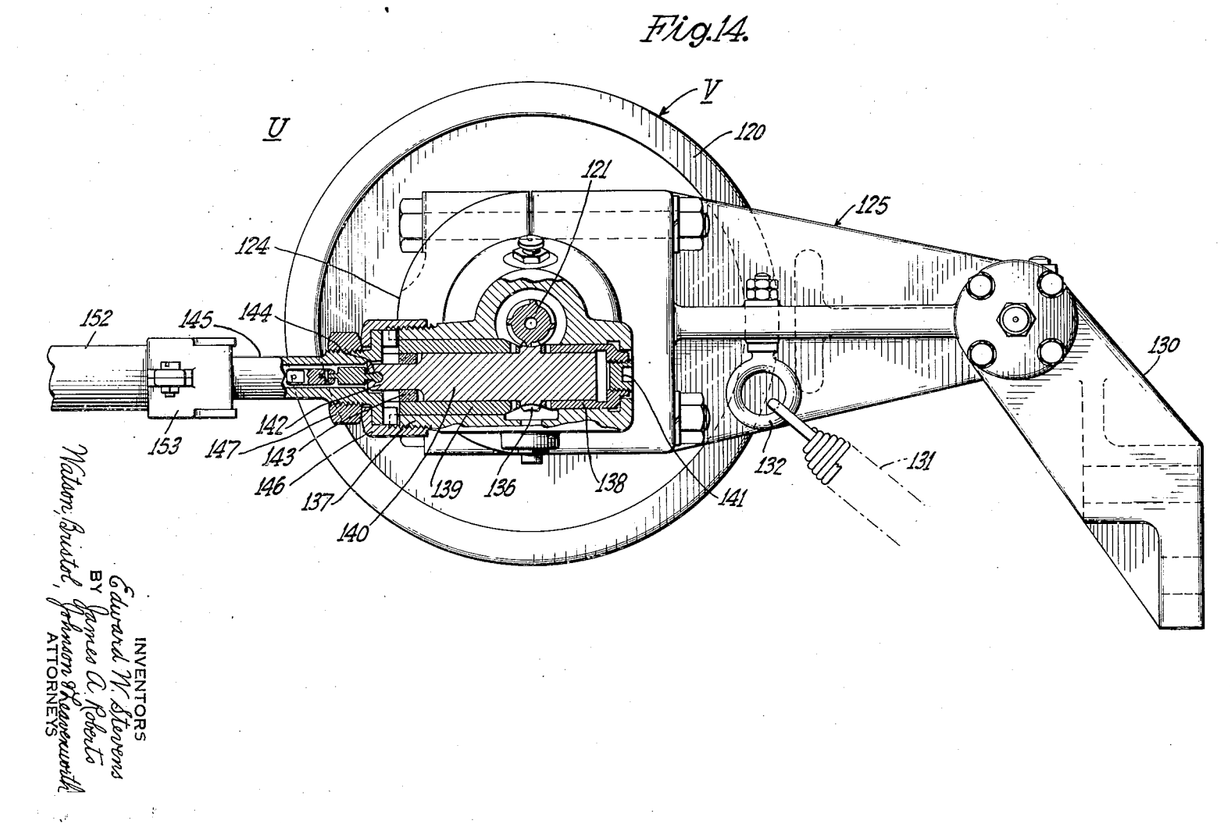
Fig. 14 is an enlarged view, mainly in side elevation, showing the metering unit shown in Fig. 1.
Figure 15:
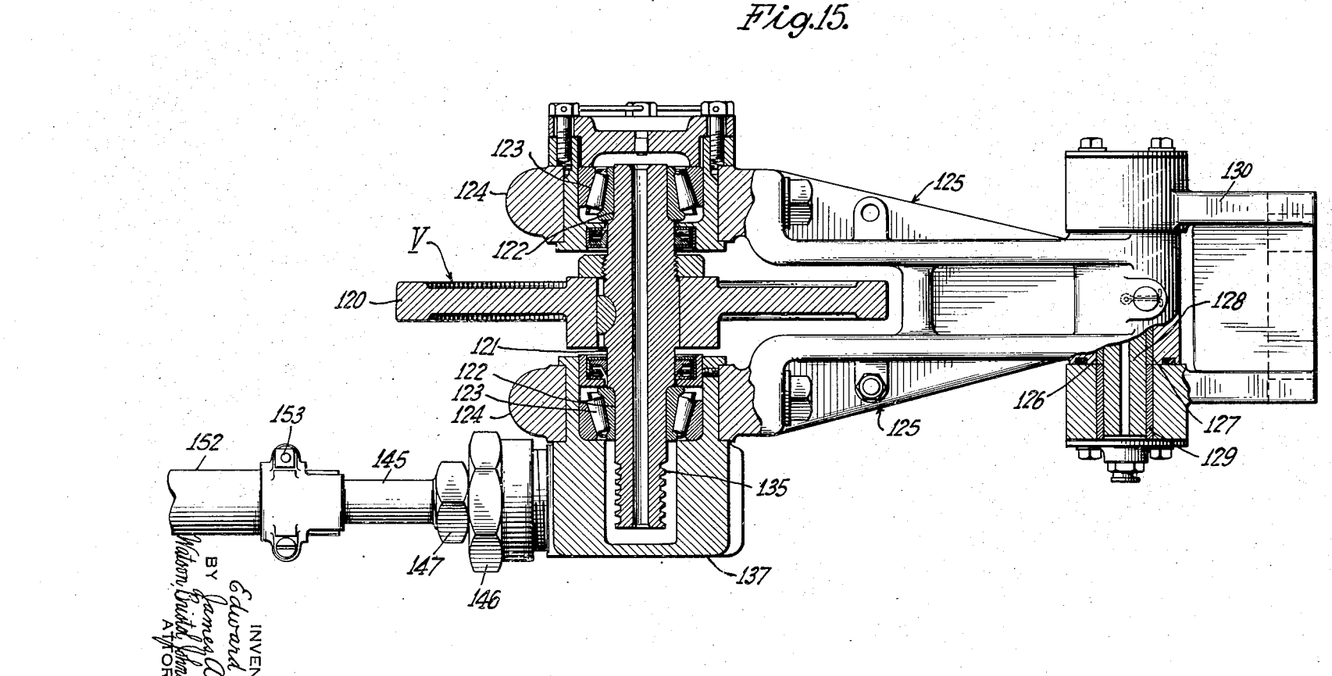
Fig. 15 is a horizontal plan view, showing the metering unit shown in Fig. 14.

The exemplary metering unit which actuates the responsive unit R, shown generally at U in Fig. 1, is illustrated more fully in Figs. 14 and 15. Here the metering wheel V has a somewhat thickened peripheral portion 120, so as to be disc-like with a narrow cylindrical surface that is adapted to make full face contact with the face of the tire on wheel W. The wheel V is mounted on a shaft 121 that may be hollow, if desired, and has relatively long journal portions 122 that are preferably mounted in suitable anti-friction bearings, for example, in roller bearings 123 in journal housings 124 secured on the tips of a bifurcated supporting frame 125. This frame may be described somewhat generally as an A-shaped frame and is preferably a metal casting with a bore 126 at its union end that is parallel to those of the journal housings 124. This bore is bushed with a liner 127 for the reception of a pin 128 that is secured therein and works in bearings 129 formed on a bracket member 130. This latter is secured to any suitable fixed part of the locomotive, for example, a part of the frame that is accessible between the drivers, as shown in Fig. 1. Such point is preferably at an elevation which permits the force of gravity to operate upon frame 125 and hold the surface of the metering wheel in contact with the tire of the driver shown. The bracket 130 is also generally oriented through a slight angle from the vertical so that the plane of metering wheel V contains the normals of the tire surface of wheel W at the point of contact; this tire surface being generally somewhat conical. The force of gravity, however, is preferably supplemented by suitable tensioning means, such as a spring 131 which is attached to an eye pin 132 on the frame 125, the other end being secured to a point on the frame of the locomotive.

To take off actuating motion, the shaft 121 is preferably extended, as shown at 135 and formed with a worm for engagement with a worm gear 136 that is disposed on an auxiliary shaft, shown at 140. This auxiliary shaft also has relatively elongated journals and is mounted for revolution about an axis which is substantially perpendicular to that of shaft 121. Accordingly the auxiliary shaft is shown journaled in a housing 137 which is secured on one bifurcation of the frame 125. This housing is bushed with relatively long bearing members, as shown at 138 and 139, for the support of the elongated end portions of the shaft 140, whereby long wearing qualities are obtained. Bearing member 138 has a closure 141 which is preferably removable to afford access to the inner end of the shaft 140. The other or outer end of shaft 140 is terminated with a reduced portion 142; the auxiliary shaft assembly being held in place by a collar 143 that is slipped over portion 142 and engages with the end of bearing bushing 139. The projecting end of portion 142 is bifurcated, as shown at 144, for coupling with the motion transmitting and connecting unit U, as hereinafter explained.

The motion transmitting unit

Figures 16, 17:
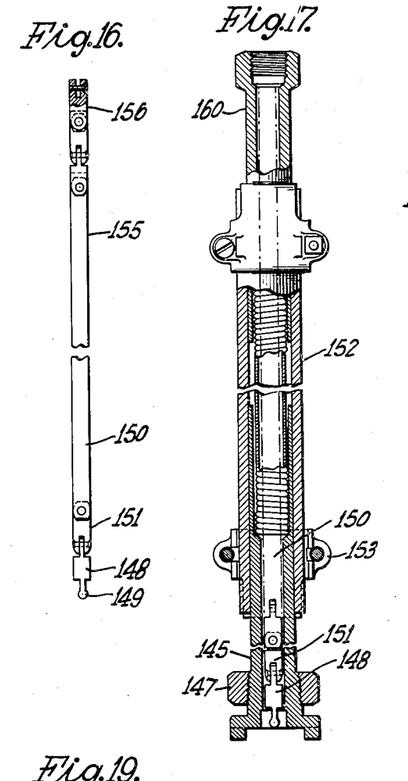
Fig. 16 is a view, mainly in elevation, parts being broken away, showing the connecting cable of the transmitting unit.
Fig. 17 is a similar elevational view, parts being broken away, showing the encased lower portion of the transmitting unit.

The exemplary motion transmitting and connecting unit U, shown in part in Figs. 14 and 15, is illustrated more fully in Figs. 16 and 17. Such unit is here seen to comprise a coupling sleeve 145 having a nut 146 and locknut 147 for holding it in engagement with the end of housing 137 adjacent the reduced shaft portion 142. Sleeve 145 has rotatably disposed in it a terminal portion 148 which is formed with an end 149 adapted to engage with the bifurcation 144. Portion 148 is articulated to flexible cable 150 by a joint at 151. Sleeve 145 being rigid, it is not suitable to convey cable 150 for any great distance. Accordingly, a flexible casing or elastic tubing 152 is attached to the sleeve by suitable means such as a friction collar 153. Casing 152 conveys the cable 150 over the driver W to a point where it may be detachably connected to another portion 155 of the cable which is connected to part 150 by an intermediate coupling 160.

Figure 18:
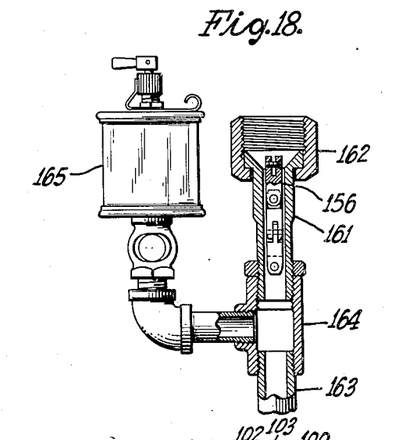
Fig. 18 is a view, mainly in elevation, showing details of the connections employed for attaching the transmitting unit to the responsive unit and includes a means for hydrostatically supplying lubricant to the unit.

Cable portion 155 is arranged to extend up into the cab of the locomotive and is provided with an upper terminal portion 156 adapted to engage with the terminal shaft 15 for actuating the responsive unit R. Terminal portion 156, as shown in Fig. 18, is journaled in a sleeve coupling 161 that has a coupling nut 162 adapted to engage with the thread on bearing block 14' for holding the portion 156 in position to engage shaft 15. Coupling sleeve 161 has a depending casing 163 that houses the cable portion 155 and extends to the intermediate coupling 160. Interposed at the upper end between sleeve 161 and the casing 163 is a coupling housing 164 that has an oil-cup 165 in communication therewith. This oil-cup is used to supply lubricant to the interior of the casing 163 in which the cable turns. The cable consisting of articulated portions 148—150—155—156 is this seen to provide a flexible coupling that transmits actuating motion to the terminal shaft 15 in unit R at the rate at which the auxiliary shaft 140 is rotated by the metering wheel V when the locomotive moves.

Operation

The operation of the apparatus, comprising units R, T and U, when assembled so as to transmit actuating motion is as follows:

When the locomotive moves, the motion of the wheel W causes the metering wheel V to rotate and drive shaft 121 and hence the worm 135. This rotary motion causes the auxiliary shaft 140 to rotate at a rate proportional to the speed of the locomotive, the shaft 140 reversing its direction of rotation with a reversal of the direction in which the locomotive moves. Auxiliary shaft 140 being coupled by the cable portions 148—150—155—156 with terminal shaft 15 rotates the latter at a rate which is proportional to the speed at which the locomotive is moving.

Terminal shaft 15 when set into rotation operates either through the train of gearing 17—19 or directly through the gear 17' to cause rotation of the gear 20 which drives the shaft 21 and pinion 22 in a clockwise direction, regardless of the direction in which the locomotive is traveling; the rate of rotation being preferably the same as that of the shaft 140. The pinion or gear 22 actuates all the mechanism in the casing 10 of the unit R, the train comprising gears 22, 40 and 44 operating to drive the pump 23. The pump, when driven, positively sets up a circulation of the working fluid through the circuit comprising chambered spaces c, e, d and f; the rate at which the fluid is circulating at any instant being proportional to the speed at which the locomotive moves. The working fluid, when pumped, enters the cylinder d at the bottom and impacts the piston 25 and causes it to move upwardly and uncover a sufficient length of the metering slot 27 to accommodate the rate at which the working fluid is circulated. This upward movement of the piston 25 is seen to work against the downward force of weight 34. The piston is hence prevented from rising unduly and the resulting displacement is proportional to the volume of working fluid being circulated at any instant. The rise of the piston 25 is thus seen to be a distance which represents proportionally the speed at which the locomotive moves.

The upward movement of the piston 25 is transmitted through bracket 37 to the actuating bar 55 that carries the rack 65. The bar 55 thus moves upwardly a distance identical with the piston movement in response to fluid circulated. Rack 65, when thus moved, rotates pinion 66 and causes hand 13 to turn through an angle and travel over the divisions on the dial 12 to a point which shows the speed at which the locomotive is moving.

The movement of the actuating bar 55 also causes movement of the rod 59 and the record making device 60. This latter is seen to draw stylus 101 across the chart 61 at a distance equal to the movement of the piston 25. The distance from the bottom of the chart at any instant is thus seen to be proportional to the speed of the locomotive. The stylus 101, in consequence, makes a mark upon the chart 61, the height of which on the chart registers the speed of the locomotive at the instant of marking. Chart 61 may, therefore, be initially marked off with horizontal lines showing given speeds.

Pinion 22 not only drives the pump 23 but also the vertical shafts 76 and 78 through the train of gearing in the housing 42. These shafts are seen to effect the longitudinal movement of the chart 61 which brings a new portion thereof under the stylus continuously, as the locomotive travels along the road. Since the feeding drum 81 over which chart 61 is threaded, has positive engagement with the chart through teeth 88, transient errors in the feeding of the chart are eliminated. When the locomotive moves, the chart 61 is fed from the supply roll 83 to the receiving roll 80 by the engagement of teeth 88 of drum 81. The bobbin 79 of the receiving roll 80, being in frictional engagement with shaft 78 and generally over-driven for the rate at which the chart 61 is fed onto the receiving roll, will slip to acommodate the roll to the rate at which the chart is positively fed by the drum 81. This avoids slack at all times in the chart 61. The speed record made on the chart consequently is a wavy line whose abscissa represents distance traveled, each point corresponding precisely to some point along the road, while ordinates correspond to speeds of the locomotive at such points. The chart 61 thus contains a record and an inspection of the same will divulge the speed at which the locomotive was traveling at each point along the road.

The total distance traveled by the locomotive is seen to be recorded on the counter 90 which is in the casing above the plate 82. This counter is seen to be actuated by the drum 81 which has pins 89 that engage the free end of lever 92 as the drum 81 rotates. The lever 92 is thus caused to oscillate and move the free end of the actuating lever 91 on the counter 90 at intervals; an oscillation of the levers 91 and 92 taking place every time a pin 89 moves an arcuate distance that engages and disengages the biased lever 92. Since the spacing of the pins 89 corresponds to definite distances traversed by the locomotive, such as one mile, the counter 90 is thus seen to run up numerals showing miles traveled by the locomotive.

When an attendant desires access to the recording mechanism of the responsive unit, a key is inserted in the lock at 115 and the top portion 112 of the cover 11 thrown back. This is seen to afford access to the entire space above the plate 82. The records of the chart 61 and the counter 90 may then be taken off; also the chart may be changed, or the counter reset. The use of a locked compartment for retaining the recording mechanism of the responsive unit is seen to provide in a fool-proof manner for the making and the preservation of records while the locomotive is in service. The records made by the present instrument are, of course, accurate provided the instrument has been calibrated and adjusted to give accurate responses.

*Method of calibration*

When the recording and indicating apparatus here provided is completely assembled, it may be initially tested in the factory. To this end it is set up and preferably made to emulate as nearly as feasible the running conditions found on locomotives when in service. It is preferred to test the apparatus at all speeds ranging between the limit selected for indication. Such limit may be, for example, 10 and 120 miles per hour. To make a shop test, a responsive unit or instrument is set up and run for a considerable period of time, during which the instrument is carefully calibrated for speeds between the limits selected. The principles of construction of this instrument are such, as has been seen, that when calibration is once completed, it will remain permanent over a long period of time. Only an accident or some very unusual condition wil make necessary a recalibration. When originally calibrating an instrument or when recalibrating the same while in service, the procedure recommended is as follows, such procedure being adapted to be carried out by a service attendant while on a locomotive.

The responsive element of the present instrument being a flow actuated piston working in a hydraulic system having a fluid circulated by positive displacement, it is seen that it is the proper regulation of the piston movement that is to be achieved by the control elements here incorporated. The control elements are two in number, the width of the opening of slot 27 and the distance initially uncovered by the piston 25. The adjustment of these values comprises the steps by which the present instrument is calibrated. Three elements comprise the calibrating means employed, namely the fixed slot 27 in the side of the piston cylinder, the movable bar 28 which is adjustable across the slot 27, and the vertically adjustable slot uncovering piston 25.

The method of calibration comprises a cycle of steps by which these elements are adjusted to cooperate with precision. The main adjustments are afforded whereby the length $x$ of the uncovered portion of slot 27 will just accommodate the fluid circulated by the pump 23 at each of the various speeds between the limits selected.

Figure 3:
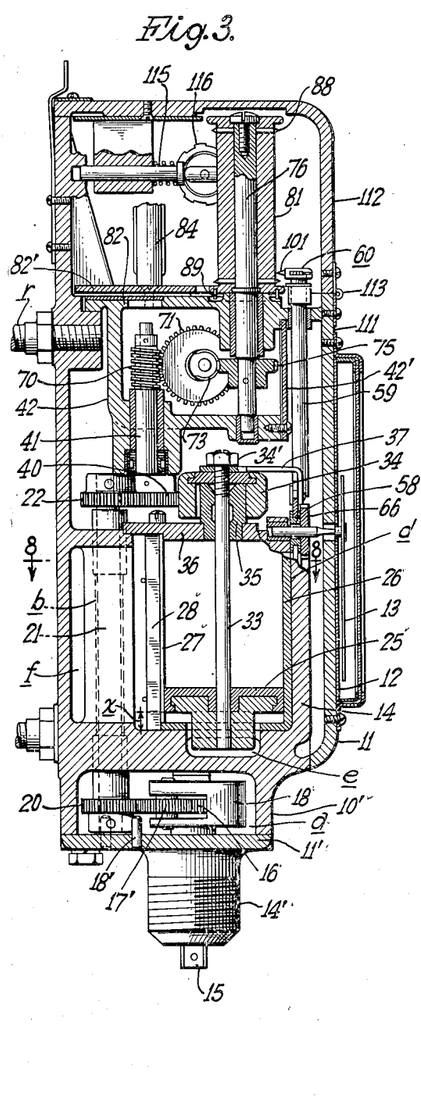
Fig. 3 is a vertical sectional view, parts being shown in elevation, of the responsive unit, shown in Fig. 2, as seen from the left hand side.
Figure 9:
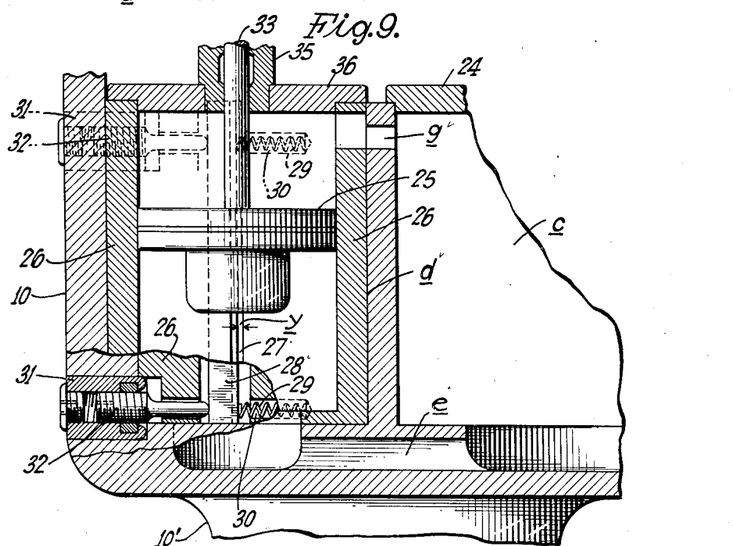
Fig. 9 is a fragmentary vertical section of the responsive unit showing details of the responsive element comprising a hydraulically actuated piston and the controlling metering orifice, the section being taken on the broken line 9—9 of Fig. 8.

This cycle may be considered by referring to Figs. 3 and 9. As a first step the piston 25, when at rest, is set to uncover a length $x$ of slot 27 taken at a suitable initial trial value. This setting is made by turning rod 33 in weight 34 while the latter is resting on the top gland 35. The next step is to adjust bar 28, so as to have a width $y$, of suitable initial trial value. This latter adjustment is accomplished by turning the screws 32. The third step is practiced while the indicating parts of the instrument are still at rest and consists in adjusting the hand 13 to read a selected low limit value on the dial 12, for example, 10 miles per hour.

In order to calibrate the instrument in the shop, the procedure is as follows: Remove the plug 110 and insert a standard tachometer to engage with the revolution counting shaft 105. A variable speed drive such as a pneumatic drill may be attached to the coupling end of shaft 15, for test purposes. The ratios of the gear train may, of course, be designed to have substantially any desired values; for example, the revolution counting shaft may be designed to make 600 revolutions per mile, or stating it in another way, 10 revolutions per minute of the revolution counting shaft is equivalent to a speed of one mile per hour. By the use of a tachometer, as indicated, it is seen that the instrument here provided may be calibrated while in active service on the road, which is a feature not heretofore found in recording and indicating instruments intended for use on locomotives.

When the initial three calibrating steps have been accomplished, as described above, the speed of the instrument may be gradually increased until the tachometer registers a substantial value, for example, 200 R. P. M. which corresponds to a reading of hand 13 on the dial of 20 M. P. H., provided the initial valve and piston adjustments for $x$ and $y$ are correct. The next step is to increase the speed gradually until the tachometer needs a relatively high value, for example, 1100 R. P. M. when, provided the previous adjustments are correct, the hand 13 on the dial will read 110 M. P. H. Assuming, for purposes of illustration, that these two readings 20 and 110 M. P. H. are given correctly on the dial, the next step is to lower the speed to an intermediate value, for example, 700 R. P. M. which would correspond to a reading on the dial of 70 M. P. H. If such dial readings correspond to the speeds intended to be indicated, as described above, the calibration may be taken as complete.

It may be desirable to check, however, since it may be that while the lower reading of 20 M. P. H. is correct, the top reading may be off; i. e., instead of being 110, the dial indication may be but 100 M. P. H. This means that for increasing speeds there is an increasing error. This may be seen at a glance, since if slot 27 be too wide at the top it would have too much capacity for the output of the pump at 100 R. P. M., and the piston is raised only a distance which will indicate 100 M. P. H. Therefore, it will be necessary to readjust the bar 28 and make the slot narrower at the top scale end. To do this, the upper screw 32 only is adjusted. With the tachometer reading 1100 R. P. M. the attendant turns the screw until the dial reading is 110 M. P. H. The lower scale end should then again be checked for the 20 M. P. H. speed corresponding to the tachometer reading of 200 R. P. M. This is done because when one end of the bar 28 is adjusted the opposite end is affected to some extent and may require another slight adjustment.

There remains the matter of checking the original calibration of a recording and indicating instrument for its readings on the central portion of dial. These readings are governed by the position of the piston with relation to the bottom end of metering slot.

Going back again to the original example; after the instrument has been calibrated correctly for the two speeds of 20 and 110 miles per hour, the speed is changed to an intermediate value, such as 700 R. P. M. on the tachometer. This should give an indicator dial reading of 70 M. P. H. If it be assumed that the dial reading is only 60 M. P. H. instead of 70 M. P. H., it indicates that the original length of slot 27 that is below the piston when in its lowest position is too small. It will, therefore, be necessary to release the lock nut 34' then raise the position of the piston in the liner 26 by turning the weight 34 so as to raise the rod 33. The new setting resulting will increase the length $x$ of the metering slot below the piston somewhat. A recalibration is then proceeded with by adjusting first for the two limit positions on the indicator scale, say 20 M. P. H. and 110 M. P. H. by the use of the tachometer reading 200 R. P. M. and 1100 R. P. M. After which the intermediate or 700 R. P. M. reading is made on the tachometer, and it should show a speed indication on the dial very close to the true value.

It will, therefore, be seen that in order to calibrate an instrument of the present invention, there are but two basic adjustments to be made. One is that had by adjusting bar 28 for regulating the width $y$ of the metering slot, and governing the dial readings at the upper and lower ends of the scale; the other is that had by adjusting the piston 25 with relation to the lower end of the cylinder, for regulating the uncovered distance $x$ and controlling the readings in and adjacent to the middle of the scale on the indicating dial. That is, after calibrating both ends of the scale if it be found that the dial readings at the middle of the scale are high, then the piston rod should be lengthened by means of the screw adjustment on the piston rod in its weight 34. If the dial readings in the middle of the scale be lower than they should be, then the piston rod should be shortened.

When the calibration is completed and the moving parts at rest, the record making device 60 is carefully adjusted so that its pencil point is positioned exactly on the lower or 10 miles per hour speed line of the chart 61. The speed as recorded on the chart will then coincide with the readings on the indicator dial.

Where the hydraulic system in the responsive instrument calibrated is provided with the optional additional flow controlling by-pass 38 and throttling valve 39, readjustment or recalibration of the instrument may be quickly accomplished while in service without following the cycle of steps of adjustment outlined above by simply adjusting the valve 39. Assuming that the initial calibration has been properly made by the practice of the approved cycle of steps, recalibration when required can be made on the locomotive while in service by noting the distance or speed recorded when the locomotive has traveled a known distance or moved at a known speed. The indication given by the instrument is carefully noted, and should there be any error, this may be compensated for by adjusting valve 39 in the proper direction. This avoids changing the values of $x$ and $y$ at the metering slot, which may be assumed to be in proper ratio. When this adjustment is made more or less working fluid is by-passed and the scale indications are brought to indicate true values both at the end and intermediate positions.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described our invention, what we claim as new and desire to secure by Letters Patent is:

1. In a speed responsive instrument, the combination with a casing having a terminal shaft rotatable at a rate proportional to the speed to be indicated, of a driving train in said casing geared to said shaft including a reversing mechanism, a hydraulic system in said casing comprising a pair of communicating chambers through which a working fluid may be circulated, a gear pump disposed in one of said chambers for effecting the circulation of said fluid in said system, means for driving said pump by said gear train, the other of said chambers being provided with a longitudinal metering slot, means accessible from outside said casing for adjusting the width of said slot, a piston working in said slotted chamber and arranged to be impacted by the fluid circulated and to move a distance uncovering a portion of said slot proportional to the velocity of the fluid being circulated, adjusting means for determining an initial uncovered portion of said slot, means actuated by said piston for giving an indication responsive to the movement of said piston, and means associated with said system for by-passing a desired portion of the working fluid about said metering slot.

2. In a speed responsive instrument, the combination with a casing having a terminal shaft rotatable at a rate proportional to the speed to be indicated, of a hydraulic system in said casing comprising a pair of communicating chambers through which a working fluid may be circulated, a rotary pump disposed in one of said chambers for effecting the circulation of said fluid in said system, means for driving said pump by said terminal shaft, the other of said chambers being provided with a longitudinal metering slot, a piston working in said slotted chamber and arranged to be impacted by the fluid circulated and to move a distance uncovering an area of said slot corresponding to the velocity of the fluid being circulated, means actuated by the piston for giving an indication responsive to the movement of said piston, and means for adjusting the angle of taper of the size of said metering slot.

3. In a speed responsive instrument, the combination with a casing having a terminal shaft rotatable at a rate proportional to the speed to be indicated, of a hydraulic system in said casing comprising a pair of communicating chambers through which a working fluid may be circulated, a rotary pump disposed in one of said chambers for effecting the circulation of said fluid in said system, means for driving said pump by said terminal shaft, the other of said chambers being provided with a longitudinal metering slot, a piston working in said slotted chamber and arranged to be impacted by the fluid circulated and to move a distance uncovering an area of said slot corresponding to the velocity of the fluid being circulated, means actuated by the piston for giving an indication responsive to the movement of said piston, means for adjusting the width of said slot at one portion thereof, and independent means for adjusting the width of the slot at another portion thereof.

4. In a speed responsive instrument, the combination with a casing having a terminal shaft rotatable at a rate proportional to the speed to be indicated, of a hydraulic system in said casing which comprises a rotary pump driven by the terminal shaft and arranged to circulate a working fluid through through said system, said casing having a wall provided with a slot through which the fluid passes, a piston covering a portion of said slot and arranged to be impacted by the circulating fluid to vary the length of the uncovered portion of the slot in accordance with the velocity of the fluid, means for adjusting the width of said slot and means for adjusting the angle of taper of the sides of the slot, and means actuated by the piston for giving an indication responsive to the movement thereof.

5. A speed indicator comprising a casing having a terminal shaft rotatable at a rate proportional to the speed to be indicated, a hydraulic system in said casing comprising a pair of communicating chambers through which a working fluid may be circulated, a rotary pump driven by said terminal shaft and disposed in one of said chambers for effecting the circulation of said fluid in said system, the other of said chambers having a wall provided with a vertically extending metering slot, a valve element mounted on said slotted wall in overlapping relationship with one vertical edge of the metering slot, a pair of vertically spaced independently operable adjusting members engaging the valve element for regulating the effective width and taper of the metering slot, a piston working in said slotted chamber and arranged to be impacted by the fluid circulated and to move a distance uncovering an area of said slot corresponding to the velocity of the fluid being circulated, and means actuated by the piston for giving an indication responsive to the movement of said piston.

6. A speed indicator according to claim 5 which includes gravity operated means for exerting a uniform downward pressure on the piston resisting displacement by the impacting action of the fluid.

EDWARD W. STEVENS.
JAMES A. ROBERTS.